SUPERCONDUCTING COMPOSITE ARTICLES

Filed Nov. 2, 1961

Inventors:
Charles P. Bean;
John C. Fisher,
by [signature]
Their Attorney.

3,214,249
SUPERCONDUCTING COMPOSITE ARTICLES

Charles P. Bean and John C. Fisher, Schenectady, N.Y., assignors to General Electric Company, a corporation of New York Filed Nov. 2, 1961, Ser. No. 149,589
8 Claims. (Cl. 29—180)

This invention relates to superconductors and more particularly to novel superconductive bodies capable of withstanding high current and high magnetic field for long periods of time, and to a new method for producing these bodies.

While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous and to advances in cryogenics which removed many of the economic and scientific problems involved in extremely low temperature operations.

As is well known, superconduction is a term describing the type of electrical current conduction existing in certain materials cooled below a critical temperature, $T_c$, characteristic of each superconducting material, below which resistance to the flow of current is essentially nonexistent. A current will be induced in a superconductive material, just as in a normal conductive material, by subjecting the material to a magnetic field. However, whereas the current will die away with the liberation of heat in the normal material, the current in the superconductive material will theoretically continue for an infinite time, as long as the material is below the critical temperature and the field is below a critical field $H_c$, and is therefore called "supercurrent" to distinguish it from the usual current present in ordinary conductors or in superconductors at temperatures above the critical temperature. If the superconductive material is subjected to a magnetic field at a temperature above $T_c$, the induced currents will die away, and at the same time the magnetic field will penetrate the bulk of the material. If then the temperature is lowered sufficiently far below $T_c$—the exact amount depending upon the strength of the field—and if the magnetic field is not too high, supercurrents appear spontaneously in such configuration as required to expel the magnetic field. If the magnetic field is substantially all expelled, the superconductor is called "soft," and the final current and field configurations are just those that would have been obtained had the magnetic field been applied at a temperature blow $T_c$ as originally described. If an appreciable fraction of the magnetic field is trapped within the material and not expelled, the superconductor is called "hard." Magnetic fields can be trapped by a soft superconductor only when a multiply-connected geometry is provided, as a ring through which the trapped field can pass but from which it cannot escape save by moving through the body of the superconductor, which is forbidden. The trapping of magnetic fields in the body of a hard superconductor is viewed as resulting from the inherent multiple connectivity of hard superconductors. These materials contain internal superconductive rings of different properties from the bulk of the material, so that magnetic fields can be trapped there just as in a ring of soft superconductor.

The terms "hard" and "soft," as applied to superconductors, originally referred principally to these physical properties of the materials. Subsequently, however, the terms have ordinarily been used when referring to the magnetic properties, although there is often a correlation between the physical and magnetic hardness and softness. As a general matter, it may now be assumed that a hard superconductive body is one wherein, either by virtue of composition or geometry, or both, the application of a magnetic field to it at temperatures below $T_c$ will result in magnetic flux being "trapped," that is, remaining even after the applied magnetic field has been removed. This so-called trapped flux actually derives from sustaining supercurrents created in the superconductive body by the applied magnetic field. Because of the trapped flux, a hard superconductive body is one in which irreversible magnetic effects are present. Stated slightly differently, a hard superconductive body will evidence magnetic hysteresis when subjected to a cyclically-reversed applied magnetic field.

Soft magnetically superconductive bodies are, by way of comparison, composed of materials which are not inherently magnetically hard and which have only a simply-connected surface. If a soft superconductive material is shaped in any solid form that can be derived by distorting a sphere, the superconductive body is soft—it will trap substantially no flux. If, on the other hand, the same soft material is shaped into a ring, the resulting superconductive body can trap flux through the ring. If the same soft material is shaped into a filamentary network of many interconnected rings, it can trap flux throughout the volume of the network, and resembles a hard superconductor.

The discussion thus far has omitted any reference to another factor which is to some degree responsible for the lack of use of superconductive bodies where the trapped magnetic flux is the element sought. This factor is the amount of supercurrent and contemporaneous trapped magnetic flux which can be obtained. The applied magnetic field to which a superconductive body is subjected begins to penetrate the skin or surface of the body and immediately creates a supercurrent which precludes the further penetration of the body. However, the supercurrents and magnetic field cannot rise indefinitely. If a critical field $H_c$, which depends upon temperature and approaches zero at $T_c$, is exceeded, the superconductor turns back to the normal state. The depth to which the flux penetrates is exceedingly small, for example, less than about 1000 A. in the best materials. If a superconductor were to withstand a field substantially greater than the bulk $H_c$, it would be necessary to subdivide it so that in at least one dimension it was substantially smaller than the bulk penetration depth $\lambda$.

It has been found that hard superconductive bodies possess higher critical fields, $H_c$, than soft superconductive bodies and available evidence increasingly supports the proposition that the higher critical fields, and therefore higher current densities, are manifestations of the microstructure in hard superconductive bodies. Specifically, the magnetic properties of high critical field superconductors are felt to inhere from what may be described as a fine filamentary mesh which pervades the bodies. Such a mesh provides connectivity that has an extremely high multiplicity, and accounts for the trapping of flux. Since the filaments are thinner than the penetration depths of a gross superconductive body, they will remain superconductive in the presence of externally applied magnetic fields which exceed the critical field of the gross superconductive body, accounting for the higher critical field.

We now believe that flux penetration in multiply connected filamentary bodies differs from that for gross or bulk superconductors by extending for much greater distances into the interior. This relationship is indicated by the expression $\Delta = 5H/2\pi J_C$ where $\Delta$ is the penetration depth in centimeters, H is the applied magnetic field, and $J_C$ is the maximum macroscopic superconducting current density in the composite material. The value of $\Delta$ may be as large as several centimeters. The striking results of this general concept are that the magnetization of a filamentary superconductor depends upon the macroscopic dimensions of the sample, so long as this macroscopic dimension is not too much greater than Δ, this being a feature that was heretofore contraindicated, and that the current-carrying ability of the filamentary superconductor is greatly enhanced, the currents extending throughout a layer of material of maximum thickness Δ rather than the much smaller distance λ characteristic of soft bulk superconductors.

In accordance with this latter general concept we have envisioned composite bodies having characteristics of hard superconductors but comprising films of superconducting material disposed in and supported by nonconducting elements or matrices. We also have invented novel composite bodies having unique high critical field properties and other such bodies having high critical temperature characteristics which comprise filamentary networks of superconducting material distributed through non-conducting matrices. In the case of these filaments as well as in the case of the superconducting films the thickness, i.e. the minimum dimension, does not exceed the penetration depth λ of magnetic flux as described above and preferably is considerably less than that value throughout the greater part of the superconductor structure. Thus, we have found that for best results and highest critical field values the thickness of these films and of the individual threads or strands comprising filament networks should be of the order of 500 A. or less.

As an additional feature of our present invention, a porous ceramic body is employed as a matrix for filamentary networks meeting the foregoing specification. Alternatively, we contemplate using for this purpose resinous or plastic bodies and inorganic non-conducting bodies in general which have interconnecting pores within which the superconductive material can be deposited, formed or otherwise provided in any suitable way to create the filamentary networks necessary to the results of this invention. However, porous bodies having pores substantially greater in average cross-section than 500 to 1000 A. may in accordance with this invention be employed advantageously in the production of the filamentary type of novel composite articles described above. The pores of such bodies are only partially filled as by coating or lining the pore-defining walls thereof with superconducting material so as to meet the critical cross-sectional or thickness dimension limitation described above. The same insulating materials may suitably be employed in the construction, assembly or formation of laminated bodies including the aforesaid superconducting films, but it will be understood that no advantage is obtained by utilizing porous material for insulating these films.

We have also conceived the possibility of producing these novel composite bodies in a variety of shapes and sizes to meet the requirements of various uses. In this connection, it is a special feature of this invention that in order to obtain essentially maximum high critical field properties in these bodies it is not necessary to multiply the number of laminations of superconducting films or increase the depth of penetration of the super-conducting filamentary network in the composite bodies greatly beyond the penetration depth Δ characteristic of the body. Test results have confirmed the assumption implicit in the foregoing general concept that the novel properties of these new bodies are produced by or attributable to relatively superficial portions of the films and filament structures and that relatively little additional enhancement in these properties can be obtained simply by doubling or tripling or even further multiplying the superconducting film or filament content of a given composite body beyond the critical dimension Δ.

Those skilled in the art will gain a further understanding of the present invention from the detailed disclosure thereof as set out below, taken in conjunction with the drawings accompanying and forming a part of this specification, in which.

It will be understood in view of the foregoing that in general the present invention contemplates a composite body having superconducting properties and comprising non-superconducting, non-metallic material and superconducting material surrounding portions of the non-metallic material. More specifically, this invention contemplates a body which comprises a matrix mass of non-superconducting non-metallic material and a filamentary network of superconducting material distributed through and supported by the matrix mass. Still more specifically, the filament network of the body is made up of strands or threads of thickness less than 1000 A. distributed through interconnecting pores of the matrix mass, and located in at least a portion of the matrix mass. As indicated above, the matrix mass may advantageously be ceramic in nature, but even if it is of some other non-conducting material, the body must be so constructed that at least a portion of the matrix mass is enclosed within the superconducting film or filament structure. Likewise, it is essential if the novel effects or properties described above are to be obtained, that the foregoing critical thickness limitation be met in the major portion of the superconducting films and filamentary network strands.

The foregoing requirements are satisfied in the several representative forms of the invention illustrated in the accompanying drawings. Thus, for example, in FIG. 1 composite body 10 one inch in diameter with an axial bore one-half inch in diameter comprises a nest of a large number of cylindrical elements which are alternately ceramic and superconducting material. Insulating layers 11, 12 and 13 of silicon monoxide and superconducting layers 15 and 16 of niobium are representative of these elements and all these layers are about 30 A. thick. These layers extend the full length of the cylinders and are essentially of generally uniform thickness. The body may be formed suitably by any method known in the art which will provide extremely thin films. In this case films 15 and 16 of niobium metal may be deposited under vacuum by vaporization of a hot filament. Silicon monoxide layers 11, 12 and 13 may be deposited by evaporation from a hot filament.

Figure 3:
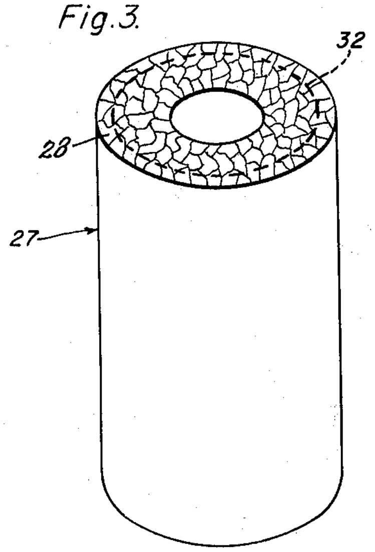
FIGURE 3 is a view in perspective of another composite body of this invention in which superconducting material is contained as a superficial interconnecting filamentary network in a porous ceramic matrix.
Figure 4:
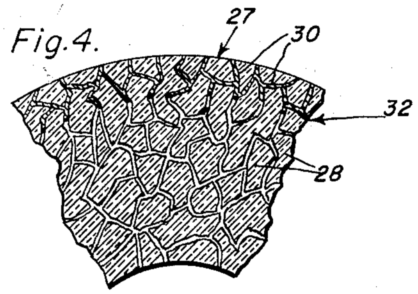
FIGURE 4 is a fragmentary transverse sectional view of the body of FIGURE 3 showing the porous structure of the matrix and the distribution of superconductive material as a continuous filamentary network through the interconnecting pores.

Composite body 27 of FIGS. 3 and 4 comprises matrix 28 of porous non-conducting material in which the pores are interconnected throughout as shown to the best advantage in FIG. 4. The pores in the outer periphery of matrix 28 are impregnated and filled with superconducting material, specifically lead, to provide a rather superficial, but continuous, interconnecting filamentary network 30. The depth of penetration of network 30 into body 27 is indicated at 32 in FIG. 3 and is shown more in detail in FIG. 4. It will again be observed, however, that in accordance with this invention the essential requirements as to thickness or minimum dimension and as to enclosure of non-conductive material by superconducting elements of an interconnecting or integral body are met.

The composite body of FIG. 3 may be produced in a variety of ways, for example by the method of production that is disclosed and claimed in copending application Serial No. 265,563, filed March 15, 1963, in the names of Ralph E. Carter and Alexis G. Pincus and assigned to the assignee hereof as a continuation-in-part of application Serial No. 149,588, filed November 2, 1961, and now abandoned.

Alternatively, the pores of body 27 may be relatively large in cross-section so that deposits formed by diffusing or otherwise introducing lead into the walls of the body, will not close the pores but will line the pore walls. The resulting superconducting filaments may be in the form of tubular films which are connected in the manner illustrated in FIG. 4 and which produce superior high critical field characteristics in the finished composite body.

Figure 5:
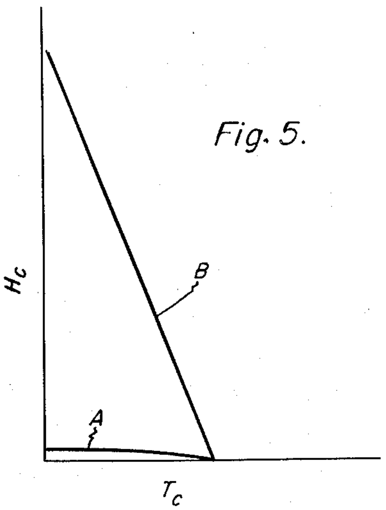
FIGURE 5 is a chart bearing curves illustrating the enhancement of critical field of a bulk superconductor obtained in accordance with this invention.
Figure 6:
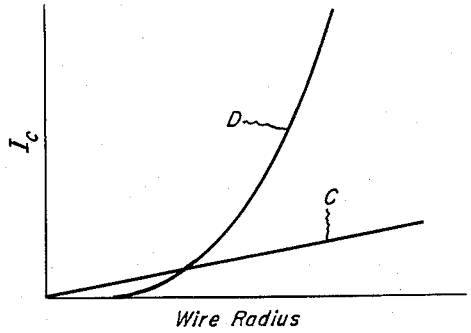
FIGURE 6 is a chart bearing curves illustrating the enhancement of the lossless current carrying capacity of a bulk superconductor through this invention.

The enhancement of critical field characteristics achieved in accordance with this invention is graphically shown in general terms by the chart of FIG. 5, and the enhancement of current-carrying capacity is shown in general terms by the chart of FIG. 6. In FIG. 5 maximum magnetic field is plotted against temperature, while in FIG. 6 losslessly carried current is plotted against wire diameter and in both cases mercury is the superconducting material used.

In bulk, pure mercury is a soft superconductor, as previously defined herein, and has a critical field that depends upon temperature, as represented by Curve A of FIG. 5. Thus, the area under Curve A represents the superconductive state while the area outside or above Curve A represents the normal resistive state of this material. Similarly, Curve B represents the boundary between normal and superconducting states in composite body 27 of FIG. 3 and in this case the critical magnetic field ($H_c$) is much greater, particularly in the temperature range closely approaching absolute zero. In fact, tests indicate that the $H_c$ value may be about 200 times greater than that of the bulk superconductor.

Curves C and D represent, respectively, the current carrying capacity of bulk mercury and mercury contained as a filamentary network in a non-metallic, non-superconducting body as exemplified by FIG. 3. The point at which these curves cross in this case approximates 20 mils and it will be understood that this will vary to some degree with different superconducting materials and with different high field superconducting film and filamentary structures.

The following illustrative, but not limiting, examples of the practice of the method of this invention in producing the present composite bodies are offered to further acquaint those skilled in the art with the precise nature of the invention.

*Example I*

The composite body of FIGS. 3 and 4 as previously described, consists of a porous ceramic or glass matrix and a body of superconducting material distributed through interconnecting pores in at least a superficial portion of the glass. The production of this composite body may preferably be carried out in accordance with the invention disclosed and claimed in the aforesaid copending application. Thus, a high-silica, low expansion sealing glass may be used, this glass containing approximately 84 percent silica, approximately 12 percent boron oxide and about 4 percent alumina. This is available as a commercial product under the Corning Glass Works registered trademark Vycor and is specifically identified as Vycor brand glass No. 7230 (Handbook of Material Trade Names, Zimmerman and Lavine, 1953 edition, page 616). In the first stage of processing the glass is melted and cast into the desired cylindrical shape 0.75 inch long, 0.16 inch outside diameter and 0.04 inch inside diameter. To provide the intricate pore network essential to the new results of this invention, the body may be immersed in a 10 percent hydrochloric acid solution for a 24-hour period to remove the boron oxide phase. After heating to dry out the resulting pores, ranging from 30 to 40 A. in diameter, and expel volatile residues of the leaching action, the body may be cooled and subjected to vacuum of one millimeter of mercury to evacuate gases from within the interconnecting pore network comprising about 35 volume percent of the body. The body may then be immersed in mercury at room temperature and subjected to an isostatic pressure of 50,000 pounds per square inch for approximately 5 minutes. Then the body may be quickly frozen in liquid nitrogen to prevent the mercury absorbed in the pores of the body from sweating out. The body may thereafter be further cooled by liquid helium to a temperature of 2.1° K. and subjected to tests which typically will show high critical field characteristics and particularly an enhancement of the $H_c$ value over that of bulk mercury. We have observed in bodies of this kind an ability to carry losslessly more than 10,000 amp./cm.$^2$ in fields in excess of 7000 oersteds. The bulk critical field of mercury is slightly in excess of 300 oersteds. While the penetration of the mercury into the pores of the body, in this case, is assumed to be limited to somewhat less than half the total pore or void volume and also is localized in the outer superficial portion of the body, no substantially further increase in $H_c$ would be obtained by completely filling the body, although it is expected that much larger currents could be carried losslessly.

*Example II*

In another operation similar to that described in Example I, but substituting lead for mercury and operating at a little above the melting temperature of lead, a composite article having high critical field characteristics may be produced. In this case, however, the body may be exposed both in its inner surface and its outer surface to the molten metal during the pressing stage and substantially more impregnation and penetration of the pore network or void volume of the body by the metal would be obtained. Nevertheless, the improvement or enhancement in the $H_c$ value over bulk lead will be of the same order of magnitude as that obtained in Example I, indicating in accordance with our findings that the new results of this invention can be obtained to a maximum degree for all practical purposes where only a relatively small amount of superconducting material is employed. This assumes that superconducting material is distributed through a network structure as filaments or threads of diameter or thickness of less than the penetration depth $\lambda$ and assumes further that the superconducting material encloses, surrounds or envelops non-conducting material of the matrix mass to provide flux-trapping sites within the structure of the composite body.

*Example III*

Figure 1:
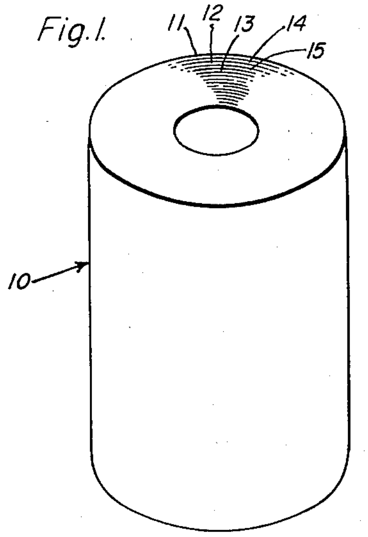
FIGURE 1 is a view in perspective of a novel composite body embodying the laminated film structure of this invention.
Figure 2:
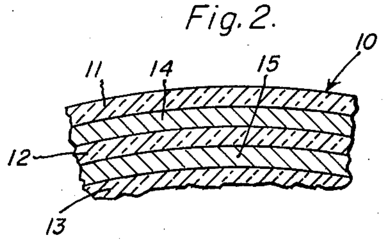
FIGURE 2 is a fragmentary, transverse sectional view of the body of FIGURE 1, showing portions of the nested, hollow, cylindrical, superconducting films and the supporting structure of non-conducting material.

In the production of an article similar to that of FIGS. 1 and 2, but using polyethylene, deposits of tantalum may be formed by vapor deposition technique on the inner surfaces of a plurality of polyethylene sheets. Specifically, the sheets may be mounted in a vacuum chamber with their inner surfaces exposed to vapors of tantalum produced by exploding tantalum wire or foil. A substantially uniform tantalum film approximately 200 A. thick can then be provided over the entire exposed inner surfaces of the sheets and this deposition can be accomplished without significantly increasing the surface temperature of the plastic material or in any way damaging the material. The sheets may then be stacked and the assembly used to conduct high currents losslessly, contacts being made in any suitable manner.

The invention subject matter disclosed and claimed herein is related to the invention subject matter disclosed and claimed in the following copending applications, all filed of even date herewith and assigned to the assignee hereof:

Serial No. 149,590, filed in the name of Warren De Sorbo.

Serial No. 149,593, filed in the name of Charles P. Bean and now abandoned.

Serial No. 149,588, filed in the name of Ralph E. Carter and Alexis G. Pincus which is now abandoned and is superseded by the aforesaid application Serial No. 265,563.

Claims of this case are drawn to species generically claimed in application Serial No. 149,590. The new articles or products defined by the appended claims may be made by the method covered in application Serial No. 149,588, now abandoned, and these artciles may be further processed or used as claimed in application Serial No. 149,593, now abandoned.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What we claim as new and desire to secure by Letters Patent of the United States is:

1. A composite body having superconducting properties comprising a matrix mass of non-superconducting non-metallic material and a continuous filamentary network of superconductive material distributed through the matrix mass and having a maximum thickness over its major portion less than 1000 A.

2. A composite body having superconducting properties comprising a porous non-superconducting, non-metallic matrix mass and a coherent structure of superconductive material disposed within pores of the matrix mass and extending through the said mass between such pores and having a maximum thickness of 500 A. over a substantial portion.

3. A composite body having superconducting properties comprising a matrix mass of non-superconducting, non-metallic material and a continuous filamentary network of superconductive material distributed through and supported by the matrix mass, the network filaments having a minimum dimension of less than about 1000 A. substantially throughout their lengths.

4. A composite body that will losslessly maintain high magnetic fields at superconducting temperatures comprising a web of a superconductive material embedded in and extending through a matrix of non-metallic and non-superconducting material, said web comprising strands or filaments of thickness less than the magnetic flux penetration depth of the superconductive material.

5. A non-porous composite body having superconducting properties comprising films of a superconductive material embedded in and extending through a matrix of non-metallic and non-superconducting material, said films being of thickness less than the magnetic flux penetration depth of the superconductive material.

6. A composite body having superconducting properties comprising a matrix mass of organic material and films of superconductive material of thickness less than 1000 A. embedded in and extending through a portion of the matrix mass.

7. A composite body having superconducting properties comprising a matrix mass of polyethylene and a continuous filamentary network of tantalum distributed through and supported by the matrix mass, the tantalum filaments having a minimum dimension of less than about 1000 A. substantially throughout their lengths.

8. A composite body having superconducting properties comprising a mass of non-superconducting material having interconnecting pores and a continuous filamentary network of lead in only a superficial portion of said mass and partially filling said pores, the lead filaments having a minimum dimension of less than about 1000 A. substantially throughout their lengths.

References Cited by the Examiner

UNITED STATES PATENTS

| | | | |
|---|---|---|---|
| 2,456,761 | 12/48 | Williams | 29—198 |
| 2,770,026 | 11/56 | Petersile | 29—149 |
| 2,866,842 | 12/58 | Matthias | 333—99 |
| 3,050,643 | 8/62 | Connell | 333—99 |

DAVID L. RECK, *Primary Examiner.*

HYLAND BIZOT, *Examiner.*